US009450236B2

(12) United States Patent
Tanaka et al.

(10) Patent No.: US 9,450,236 B2
(45) Date of Patent: *Sep. 20, 2016

(54) ELECTRODE FOR ELECTRICITY-STORING DEVICE, ELECTRICITY STORING DEVICE EMPLOYING SUCH ELECTRODE, AND METHOD OF MANUFACTURING ELECTRODE FOR ELECTRICITY-STORING DEVICE

(71) Applicant: GS Yuasa International Ltd., Kyoto-shi (JP)

(72) Inventors: Kenji Tanaka, Kyoto (JP); Kazuaki Matsuo, Kyoto (JP); Kazuhide Tozuka, Kyoto (JP); Kazuya Okabe, Kyoto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/599,314

(22) Filed: Jan. 16, 2015

(65) Prior Publication Data
US 2015/0132659 A1 May 14, 2015

Related U.S. Application Data

(62) Division of application No. 13/318,000, filed on Nov. 2, 2011, now Pat. No. 8,986,891.

(30) Foreign Application Priority Data

Nov. 5, 2010 (JP) ................... 2010-248295
Sep. 13, 2011 (JP) ................... 2011-198941

(51) Int. Cl.
*H01M 4/02* (2006.01)
*H01M 4/36* (2006.01)
(Continued)

(52) U.S. Cl.
CPC ............. *H01M 4/366* (2013.01); *H01G 11/28* (2013.01); *H01G 11/58* (2013.01); *H01G 11/86* (2013.01);
(Continued)

(58) Field of Classification Search
CPC .... H01M 4/0404; H01M 4/13; H01M 4/366; H01M 4/62; H01M 4/0435; H01M 4/362; H01M 10/0525; H01M 10/0587; H01M 10/4235; Y02E 60/122; Y02E 60/13; Y02T 10/7011; Y02T 10/7022; H01G 11/28; H01G 11/86

See application file for complete search history.

(56) References Cited

U.S. PATENT DOCUMENTS 6,309,777 B1   10/2001   Ohta et al.
6,335,114 B1    1/2002   Ueshima et al.
(Continued)

FOREIGN PATENT DOCUMENTS

EP   0 523 840 B1   4/1996
EP   2 192 639 A1   6/2010
(Continued)

OTHER PUBLICATIONS

U.S. Appl. No. 13/224,574 (Specification pp. 1-29 and Drawings Figures 1-10).
(Continued)

*Primary Examiner* — Raymond Alejandro
(74) *Attorney, Agent, or Firm* — McGinn IP Law Group, PLLC

(57) ABSTRACT

An electricity-storing device includes a first electrode, a second electrode of opposite polarity as the first electrode, and a separator. The first electrode includes a current collector foil, an active material layer formed on at least one surface of the current collector foil, and an electrical resistance layer formed on the at least one surface of the current collector foil so as to be adjacent to and in direct contact with the active material layer, at least a portion of an interface between the active material layer and the electrical resistance layer including a mixed phase where constituents from the active material layer and the electrical resistance layer intermingle.

18 Claims, 6 Drawing Sheets

(51) Int. Cl.

| | | |
|---|---|---|
| *H01G 11/28* | (2013.01) | |
| *H01G 11/86* | (2013.01) | |
| *H01M 4/04* | (2006.01) | |
| *H01M 4/13* | (2010.01) | |
| *H01M 4/62* | (2006.01) | |
| *H01M 10/0525* | (2010.01) | |
| *H01M 2/14* | (2006.01) | |
| *H01M 10/42* | (2006.01) | |
| *H01G 11/58* | (2013.01) | |
| *H01M 4/139* | (2010.01) | |
| *H01M 4/66* | (2006.01) | |
| *H01M 10/0587* | (2010.01) | |

(52) U.S. Cl.
CPC ............ *H01M 2/14* (2013.01); *H01M 4/0404* (2013.01); *H01M 4/0435* (2013.01); *H01M 4/13* (2013.01); *H01M 4/139* (2013.01); *H01M 4/362* (2013.01); *H01M 4/62* (2013.01); *H01M 4/661* (2013.01); *H01M 10/0525* (2013.01); *H01M 10/4235* (2013.01); *H01M 10/0587* (2013.01); *Y02E 60/122* (2013.01); *Y02E 60/13* (2013.01); *Y02P 70/54* (2015.11); *Y02T 10/7011* (2013.01); *Y02T 10/7022* (2013.01); *Y10T 428/2495* (2015.01); *Y10T 428/24488* (2015.01); *Y10T 428/25* (2015.01); *Y10T 428/30* (2015.01); *Y10T 428/31504* (2015.04); *Y10T 428/31678* (2015.04)

(56) References Cited

U.S. PATENT DOCUMENTS

| | | | |
|---|---|---|---|
| 8,986,891 B2 * | 3/2015 | Tanaka | H01G 11/28 429/233 |
| 2002/0197535 A1 | 12/2002 | Dudley et al. | |
| 2003/0099880 A1 | 5/2003 | Park et al. | |
| 2003/0224242 A1 | 12/2003 | Kaito et al. | |
| 2004/0183215 A1 | 9/2004 | Fujieda et al. | |
| 2004/0202928 A1 | 10/2004 | Miyamoto et al. | |
| 2006/0188785 A1 | 8/2006 | Inoue et al. | |
| 2006/0204836 A1 | 9/2006 | Kaito et al. | |
| 2006/0204837 A1 | 9/2006 | Kaito et al. | |
| 2007/0048613 A1 | 3/2007 | Yanagida et al. | |
| 2007/0122715 A1 | 5/2007 | Fujino et al. | |
| 2007/0224493 A1 | 9/2007 | Higuchi et al. | |
| 2008/0003503 A1 | 1/2008 | Kawakami et al. | |
| 2008/0118826 A1 | 5/2008 | Shimamura et al. | |
| 2008/0311479 A1 | 12/2008 | Lee et al. | |
| 2009/0111011 A1 | 4/2009 | Kim et al. | |
| 2010/0136394 A1 | 6/2010 | Miyahisa et al. | |
| 2010/0188048 A1 | 7/2010 | Nishino et al. | |
| 2010/0203396 A1 | 8/2010 | Murata | |
| 2010/0221607 A1 | 9/2010 | Hatanaka et al. | |
| 2013/0260207 A1 | 10/2013 | Uemura | |

FOREIGN PATENT DOCUMENTS

| | | | |
|---|---|---|---|
| JP | 08-050917 | 2/1996 | |
| JP | 9-219199 A | 8/1997 | |
| JP | 2954147 B1 | 7/1999 | |
| JP | 11-214036 A | 8/1999 | |
| JP | 2001-093583 A | 4/2001 | |
| JP | 2001-210304 A | 8/2001 | |
| JP | 2003-151535 A | 5/2003 | |
| JP | 2003-168417 A | 6/2003 | |
| JP | 2004-055537 A | 2/2004 | |
| JP | 2004-063343 A | 2/2004 | |
| JP | 2004-095382 A | 3/2004 | |
| JP | 2004-259625 * | 9/2004 | ............ H01M 10/40 |
| JP | 2004-259625 A | 9/2004 | |
| JP | 2005-026157 A | 1/2005 | |
| JP | 2005-509247 A | 4/2005 | |
| JP | 2006-024464 A | 1/2006 | |
| JP | 2006-173001 A | 6/2006 | |
| JP | 2007-095656 A | 4/2007 | |
| JP | 2007-103356 A | 4/2007 | |
| JP | 2007-258050 A | 10/2007 | |
| JP | 2007-273114 A | 10/2007 | |
| JP | 2009-032668 A | 2/2009 | |
| JP | 2009-038016 A | 2/2009 | |
| JP | 2009-110928 A | 5/2009 | |
| JP | 2009-518808 A | 5/2009 | |
| JP | 2010-113819 A | 5/2010 | |
| JP | 4789274 B2 | 10/2011 | |
| WO | WO 02/101854 A2 | 12/2002 | |
| WO | WO2005/067080 A1 | 7/2005 | |
| WO | WO2006/064344 A2 | 6/2006 | |
| WO | WO2009/001502 A1 | 12/2008 | |
| WO | WO 2012-081543 A1 | 6/2012 | |

OTHER PUBLICATIONS

United States Office Action dated May 8, 2014 in U.S. Appl. No. 13/224,574.

European Search Report dated Nov. 26, 2013, in EP Application No. 11177938.5.

* cited by examiner

ELECTRODE FOR ELECTRICITY-STORING DEVICE, ELECTRICITY STORING DEVICE EMPLOYING SUCH ELECTRODE, AND METHOD OF MANUFACTURING ELECTRODE FOR ELECTRICITY-STORING DEVICE

RELATED APPLICATIONS

The present Application is a Divisional Application of U.S. patent application Ser. No. 13/318,000 (now U.S. Pat. No. 8,986,891) which was filed on Nov. 2, 2011, and which claims priority from Japanese Application No. 2010-248295, filed on Nov. 5, 2010, and Japanese Application No. 2011-198941, filed on Sep. 13, 2011, all of which are incorporated herein by reference.

FIELD OF INVENTION

The present invention relates to an electrode for use in a battery, electrochemical capacitor, or other such electricity-storing device. The invention furthermore relates to an electricity-storing device employing said electrode, and to a method of manufacturing said electrode.

BACKGROUND

Wound-electrode batteries and other such laminated batteries are commonly employed in electric automobiles, hybrid cars, and other such applications where high current density and high output are sought. Progress has also been made in the development of laminated electrochemical capacitors which possess structures similar to such batteries. Laminated batteries and electrochemical capacitors include those in which sheet-like positive electrode(s), negative electrode(s), and separator(s) are layered together to form a multilayer electrode assembly; and those in which strip-like positive electrode(s), negative electrode(s), and separator(s) are laminated together in spiral fashion to form a wound electrode assembly.

Positive electrodes and negative electrodes include those comprising only metal foil (e.g., the negative electrode in a lithium battery), those in which an active material layer is formed on a current collector comprising metal foil, and those in which a current collector comprising metal foam is filled with active material. Even electrodes having active material will have a portion, usually at an edge thereof, where the metal current collector is exposed, being uncoated with active material, for connection to a current collector tab for extraction of electricity or for direct connection to a current collector terminal. In the event that this exposed metal portion forms a short circuit with the exposed metal portion of the other electrode or with the active material layer thereof, this will cause a large current to flow, and there is a possibility that the heat that is generated as a result will cause damage to the electricity-storing device. The two neighboring electrodes are arranged in opposing fashion such that the separator intervenes therebetween. However, it is possible for a short circuit to occur in such situations as when there is skewed takeup during winding or when powder that has delaminated from the electrode due to droppage or vibration during transport or use bridges the separator.

To prevent this, Patent Reference No. 1 discloses an invention in which a short circuit prevention layer is provided adjacent to the active material layer at a region uncoated with active material on the current collector foil. Furthermore, to permit lithium ions discharged from positive electrode active material to be smoothly stored within negative electrode active material during charging, nonaqueous electrolyte secondary batteries are currently designed such that the negative electrode active material layer is larger than the positive electrode active material layer and is arranged in opposing fashion with respect to the entire positive electrode active material layer. This being the case, there will necessarily be a location at which a region uncoated with active material at the positive electrode current collector foil and a region coated with active material at the negative electrode are arranged in opposing fashion such that the separator intervenes therebetween. Patent References Nos. 2 and 3 disclose inventions in which an insulating layer is formed at a portion of a region uncoated with active material at the positive electrode which is arranged in opposing fashion with respect to a region coated with active material at the negative electrode such that the separator intervenes therebetween. Furthermore, Patent Reference No. 4 discloses an invention in which a short circuit prevention layer is made noninsulating.

PATENT REFERENCE NO. 1: Japanese Patent Application Publication Kokai No. 2001-93583
PATENT REFERENCE NO. 2: Japanese Patent Application Publication Kokai No. 2004-259625
PATENT REFERENCE NO. 3: Japanese Patent Application Publication Kokai No. 2004-55537
PATENT REFERENCE NO. 4: Japanese Patent Application Publication Kokai No. 2007-95656
PATENT REFERENCE NO. 5: International Patent Application Japanese Translation Publication No. 2005-509247

Problem to be Solved by Invention

However, even where a short circuit prevention layer was provided at the design stage, there have still been occasions in which delamination or loss of the short circuit prevention layer or active material layer occurred at such times during manufacturing operations as when winding the separator and foil electrodes, when compressing the wound electrode assembly into a more flattened profile, or during handling of the electrode assembly. Furthermore, there has also been the problem of delamination or loss of the short circuit prevention layer and/or active material layer due to droppage, vibration, and so forth during use of the electricity-storing device.

SUMMARY

The present invention was conceived upon consideration of the foregoing points, it being an object thereof to provide an electricity-storing device which, during manufacture and use, has less tendency to experience delamination or loss at active material layer(s) and/or layer(s) provided for short circuit prevention or serving other function(s).

Means for Solving Problem

An electrode for an electricity-storing device associated with the present invention comprises a current collector foil; an active material layer formed on at least one surface of the current collector foil; and a high-resistance layer formed on the at least one surface of the current collector foil so as to be adjacent to and in direct contact with the active material layer; wherein, at at least a portion of an interface between the active material layer and the high-resistance layer, a mixed phase is formed where constituents from the two layers intermingle. The high-resistance layer of the present invention is a layer that is disposed so as to be adjacent to and in direct contact with an active material layer, and that has an electrical resistance which is greater than that of the active material layer. Included among high-resistance layers are electrically insulating layers. The high-resistance layer may function in such manner as to prevent short circuit with an electrode of different polarity with which it is in mutually neighboring relationship by way of a separator that intervenes therebetween, to suppress abnormal generation of heat due to short circuit, to suppress delamination at the edge portion of the active material layer, and/or the like.

By thus causing a mixed phase to be present at the interface between the active material layer and the high-resistance layer, it is possible to cause the bond between the two adjacent layers to be made strong; and because stresses that would otherwise be produced in concentrated fashion at the interface are relieved, it is possible to suppress delamination and/or loss of the high-resistance layer and/or the active material layer.

Benefit of Invention

The present invention makes it possible to achieve the benefit of reduced tendency to experience delamination and/or loss of high-resistance layer(s) and/or active material layer(s) provided on current collector foil(s) during manufacturing operations or during battery use.

DETAILED DESCRIPTION

Below, description is given with reference to drawings showing an electrode associated with an embodiment of the present invention. The present embodiment is a positive electrode for use in a wound electrode assembly for a lithium ion secondary battery, and has a positive electrode active material layer and a high-resistance layer on a positive electrode current collector foil. The primary function of the high-resistance layer in the present embodiment is to prevent occurrence of short circuit with the negative electrode.

Figure 3:
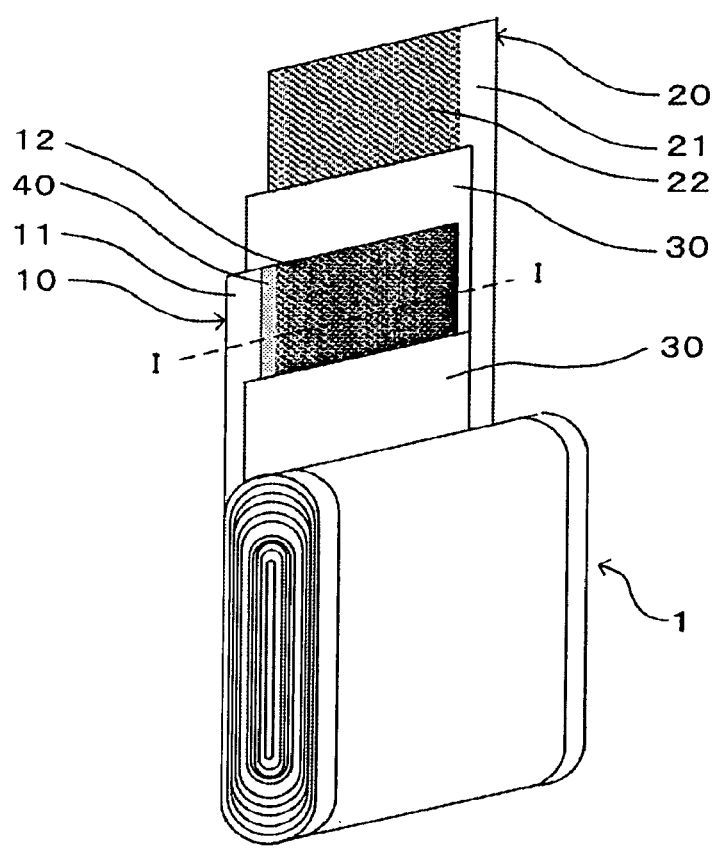
FIG. 3 is a drawing showing structure of a wound electrode assembly in a battery associated with one embodiment of the present invention.

FIG. 3 shows the structure of a wound electrode assembly 1 employing the electrode associated with the present embodiment. Strip-like positive electrode 10 and strip-like negative electrode 20 are laminated and wound together with strip-like separator 30 intervening therebetween. Positive electrode 10 has positive electrode active material layer 12 and high-resistance layer 40 on each face of positive electrode current collector foil 11, and negative electrode 20 has negative electrode active material layer 22 on each face of negative electrode current collector foil 21.

Figure 4:
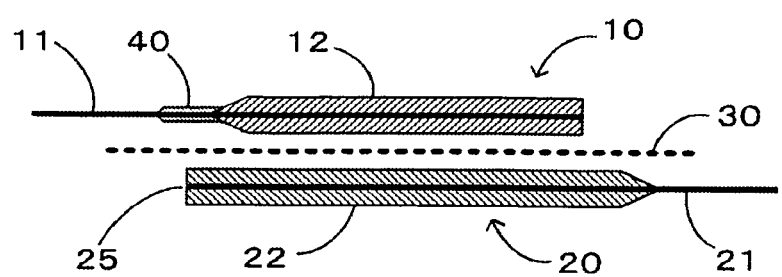
FIG. 4 is a drawing showing cross-sectional structure at a portion corresponding to a wound electrode assembly associated with one embodiment of the present invention.

FIG. 4 shows the structure of the positive electrode, negative electrode, and separator at the section indicated by I-I in FIG. 3. High-resistance layer 40 is formed on the surface of positive electrode current collector foil 11 so as to be adjacent to and in direct contact with positive electrode active material layer 12, and is disposed so as to face, by way of intervening separator 30, the edge 25 of negative electrode 20 (where negative electrode current collector foil 21 and active material layer 22 are cut), with which it is in mutually neighboring relationship by way of intervening separator 30.

Positive electrode active material layer 12 has positive electrode active material as primary constituent, and where necessary, may also have electroconductor material, binder, filler, and/or the like added therewithin. Similarly, negative electrode active material layer 22 has negative electrode active material as primary constituent, and where necessary, may also have electroconductor material, binder, filler, and/or the like added therewithin. The high-resistance layer contains inorganic and/or organic microparticles and binder, and where necessary, may also have electroconductor material and/or the like added therewithin.

Figure 1:
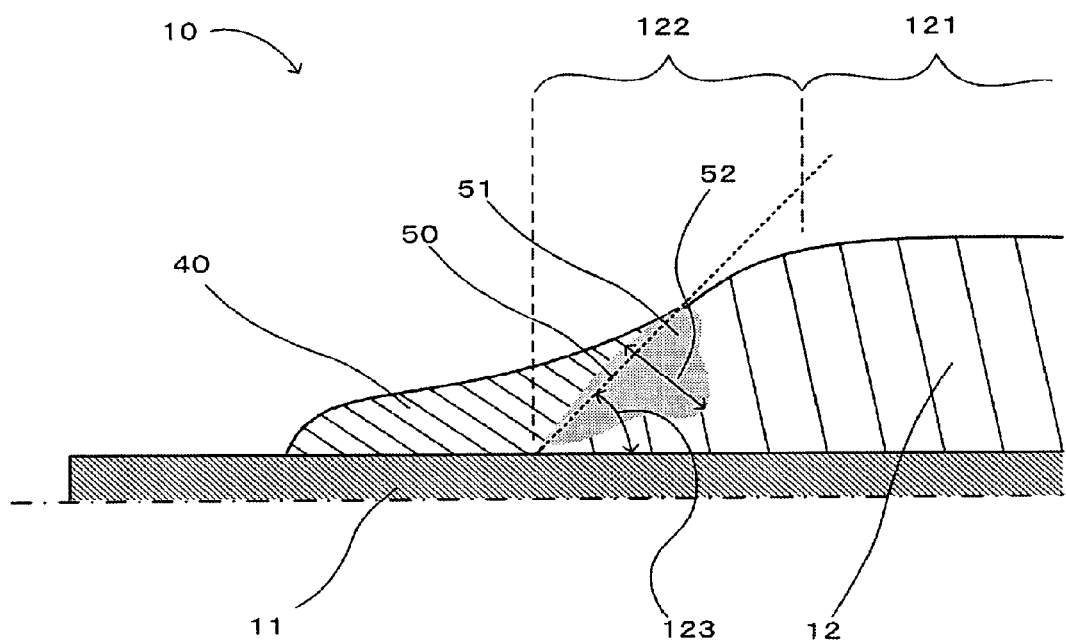
FIG. 1 is a sectional view of a positive electrode associated with one embodiment of the present invention.

FIG. 1 shows an enlarged view of a location near the side edge of positive electrode current collector foil 11 in FIG. 4. Note that FIG. 1 shows the situation at only one face of current collector foil 11, and note further that the drawing is not to scale. In the present embodiment, positive electrode active material layer 12 has bulk zone 121, which has more or less constant thickness; and tapered zone 122, where thickness tapers off at the end portion. FIG. 1 shows a section perpendicular to the edge of active material layer 12, the wedge-shaped interior angle visible in sectional view and formed by tapered zone 122 at this time being referred to as taper angle 123.

At FIG. 1, high-resistance layer 40 has been applied so as to overlap tapered zone 122 of positive electrode active material layer 12. At interface 50 between active material layer 12 and high-resistance layer 40, mixed phase 51 is formed. As used herein, mixed phase refers to a phase where constituents of two adjacent layers intermingle. While mixed phase 51 may be formed everywhere along the entire interface 50, it is sufficient in the present embodiment that it be formed at least along a portion thereof. Furthermore, in the present embodiment, the thickness of mixed phase 51 may vary depending on location.

At mixed phase 51, constituents of positive electrode active material layer 12 and high-resistance layer 40 intermingle. For example, in a situation where active material layer 12 does not contain some element X, X being present only within high-resistance layer 40, in accordance with the conventional art there would be no mixed phase present at the interface, a sharply defined boundary being observed therebetween, such that the concentration of X on the active material layer side of the interface might be substantially zero, and such that the concentration of X on the high-resistance layer side of the interface might be the average composition found throughout the high-resistance layer. In the conventional art, even when surface irregularity of active material layer 12 and migration of elements due to diffusion are taken into consideration, the thickness of the boundary region where the interface is disturbed would, at most, still be less than on the order of half of the positive electrode active material particle diameter. Note that positive electrode active material particle diameter is typically 3 µm to 10 µm. In contradistinction with respect thereto, the present embodiment shown in FIG. 1 is such that as one moves in a direction perpendicular to interface 50 from a point within the high-resistance layer 40 to a point within the active material layer 12, the concentration of X would vary locally but would nonetheless decrease overall as one goes from the average concentration within high-resistance layer 40 until one reached a point where concentration would be the average concentration at the active material layer 12 side (taken to be substantially zero except for impurities in the present example). Thus, mixed phase 51 constitutes a region that is present at the interface 50 between the two layers and that has a composition that is intermediate between the respective compositions of those two layers.

More quantitatively, for an element X, if average concentration within the active material layer is indicated as XA at %, and average concentration within the high-resistance layer is indicated as XS at %, mixed phase 51 might be deemed to be the portion for which concentration of X lies in the interval from (90 XA+10 XS)/100 to (10 XA+90 XS)/100.

Regarding the thickness of mixed phase 51, width at the location of maximum width of mixed phase 51 in a direction perpendicular to interface 50 as seen in the sectional view of FIG. 1 might be defined as the maximum thickness 52 of the mixed phase. Furthermore, where thicknesses are different for mixed phases as determined for a plurality of elements, maximum thickness of the mixed phases might be taken to be the one that is largest thereamong.

As method for measuring/inspecting mixed phase 51, electron probe microanalysis (EPMA) might be employed. The electrode might be embedded in resin and thereafter sectioned along a plane perpendicular to the interface, with EPMA being used to analyze the section and create an image showing mapping of elemental distribution, so as to permit visual inspection of the mixed phase region to be carried out, for simple determination of mixed phase thickness and maximum thickness 52. Alternatively or in addition thereto, the portion at which elemental distribution is different from active material layer 12 and high-resistance layer 40 might be taken to be the mixed phase 51, mixed phase thickness and maximum thickness 52 being determined based on this. That is, maximum thickness 52 of the mixed phase might be determined from measurement of the concentration of some element X in a direction perpendicular to interface 50 based on the results of EPMA analysis.

The element(s) to be analyzed should be an element(s) that is present in large quantity at one of either active material layer 12 or high-resistance layer 40 and that is present in small quantity at the other. Furthermore, as positive electrode active material particles are ordinarily larger than particles present in the high-resistance layer, in forming mixed phase 51, particles present in the high-resistance layer may be trapped between active material particles. It may therefore be better if the element selected for analysis is an element that is present in large quantity at high-resistance layer 40 and that is present in small quantity at active material layer 12. For example, aluminum (Al) might be selected if Al is not present at active material layer 12 but is present only at high-resistance layer 40. Note, however, that it would not be possible to select Li, since it cannot be detected by EPMA.

The larger the maximum thickness 52 of mixed phase 51, the stronger the bond will be between active material layer 12 and high-resistance layer 40, which is preferred. It is preferred that the maximum thickness 52 of the mixed phase be greater than the active material particle diameter median value (cumulative 50% particle diameter; D50), and more preferred that this be greater than three times the active material particle diameter median value.

Thickness of the bulk zone 121 of positive electrode active material layer 12 may be as dictated by battery design specifications, there being no particular limitation with respect thereto. This typically has a thickness of 40 µm to 130 µm per face when applied, which following drying and working by a press becomes compressed to a thickness of 25 µm to 80 µm per face, being formed such that the thickness distribution in the width direction of the current collector foil is within ±5%, and is preferably within ±3%.

From the standpoint of increasing electrode capacity, it is desirable that the width of tapered zone 122 be narrow, and there is no technological reason why this cannot be made more or less zero. However, it is preferred that taper angle 123 be made smaller than 90° and that tapered zone 122 be made to have a certain degree of width.

While there is no particular limitation with respect to the size of taper angle 123, it is preferred that this be not less than 10° and not more than 80°, more preferred that this be not less than 10° and not more than 45°, and still more preferred that this be not less than 20° and not more than 35°. Furthermore, while there is no particular limitation with respect to the width of tapered zone 122, it is preferred that this be not less than 20 µm and not more than 1 mm, more preferred that this be not less than 100 µm and not more than 500 µm, and still more preferred that this be not less than 150 µm and not more than 500 µm.

While thickness of high-resistance layer 40 is typically 3 µm to 15 µm, there is no particular limitation with respect thereto. It is preferred that the portion of high-resistance layer 40 that is applied to the current collector foil so as to be in direct contact therewith be subjected to working by a press. That is, it is preferred that that the thickness of high-resistance layer 40 be less than the thickness of active material layer 12 after active material layer 12 has undergone working by the press. The reason for this is as follows.

In fabricating the positive electrode and the negative electrode, current collector foils are coated with respective active materials, which, following drying, are subjected to working by a press so as to increase the densities of the active material layers. Because high-resistance layer 40 contains oxide and/or other such fine particles, to achieve satisfactory binding, binder content is made higher there than at the active material layer. When the high-resistance layer having high binder content is subjected to working by a press, the amount of elongation that results is large, producing strain at the interface between the active material layer and the high-resistance layer, and the stresses which remain following working by the press cause impairment of the bond strength at the interface. Moreover, the higher binder content of the high-resistance layer causes it to tend to adhere to the rollers of the press, which can cause problems to occur during manufacturing due to the fact that working by the press cannot easily be carried out in stable fashion.

It is preferred that high-resistance layer 40 partially overlap tapered zone 122 of active material layer 12 but not overlap bulk zone 121 of active material layer 12. Because even when the high-resistance layer 40 is thin, and hence the portion of high-resistance layer 40 that is applied to the current collector foil so as to be in direct contact therewith is not subjected to working by a press, it would nonetheless be the case if high-resistance layer 40 were allowed to overlap bulk zone 121 of active material layer 12 that the overlapping material would undergo working by the press. However, in practice it is found that one result of intermingling by high-resistance layer 40 and active material layer 12 is that there is often no problem even when material overlaps the bulk zone.

Next described is a method for manufacturing a positive electrode constituting an electrode in the present embodiment.

The materials of the various components and a method for preparing paste for application in the form of a coating will first be described.

As the positive electrode current collector, aluminum foil having excellent oxidation resistance may be favorably employed.

Foil having a thickness of 12 μm to 25 μm is ordinarily employed, and foil having a thickness of 15 μm to 20 μm may be favorably employed.

The foil material is not limited to aluminum, it being possible to use any material so long as it comprises electron conductor(s) not having adverse effect on the completed battery. For example, titanium, stainless steel, nickel, baked carbon, electrically conductive polymer(s), and/or the like may be employed. Furthermore, it is possible to employ material(s) such as aluminum or the like, the surface of which has been treated with carbon, nickel, titanium, silver, or the like.

Electroconductor material, binder, filler, and/or the like may be added as necessary to the positive electrode active material to prepare the positive electrode compound, and a suitable amount of solvent is added to the positive electrode compound to prepare the positive electrode paste for application in the form of a coating.

As positive electrode active material, known material(s) that store and/or discharge Li ions may be employed. For example, $LiCoO_2$ or lithium-containing transition metal oxides having an $\alpha$-$NaFeO_2$ structure in which Ni, Mn, or another transition metal or boron is partially substituted for Co; compounds having a spinel-type crystal structure as represented by $LiMn_2O_4$; $LiFePO_4$, $LiFeSO_4$, or polyanionic compounds in which Co, Mn, or the like is partially substituted for Fe; or the like may be employed. The positive electrode may also have added therein CuO, $Cu_2O$, $Ag_2O$, CuS, $CuSO_4$, and/or other such Group I metal compounds; $TiS_2$, $SiO_2$, SnO, and/or other such Group IV metal compounds; $V_2O_5$, $V_6O_{12}$, $Vo_x$, $Nb_2O_5$, $Bi_2O_3$, $Sb_2O_3$, and/or other such Group V metal compounds; $CrO_3$, $Cr_2O_3$, $MoO_3$, $MoS_2$, $WO_3$, $SeO_2$, and/or other such Group VI metal compounds; $MnO_2$, $Mn_2O_3$, and/or other such Group VII metal compounds; $Fe_2O_3$, FeO, $Fe_3O_4$, $FePO_4$, $Ni_2O_3$, NiO, $CoO_3$, CoO, and/or other such Group VIII metal compounds; and/or the like. Moreover, disulfidic, polypyrrolic, polyanilinic, polyparaphenylenic, polyacetylenic, polyacenic materials, and/or other such electrically conductive polymer compounds; carbonaceous materials having pseudographitic structures; and/or the like may be employed.

As electroconductor material for addition to positive electrode active material, electron conductor materials not having adverse effect on battery performance may be employed. For example, natural graphite (crystalline graphite, flake graphite, amorphous graphite, etc.), artificial graphite, carbon black, acetylene black, Ketchen black, carbon whiskers, carbon fibers, metal (copper, nickel, aluminum, silver, gold, etc.) powder, metal fibers, electrically conductive ceramic materials and/or other such electrically conductive materials may be contained therein singly or in combination. It is preferred from the standpoints of electrical conductivity and coatability that acetylene black be employed. It is preferred that this be present in an amount that is 1 wt % to 50 wt % of the positive electrode active material, and more preferred that this be present in an amount that is 2 wt % to 30 wt % thereof.

As binder for addition to positive electrode active material, any of polytetrafluoroethylene (PTFE), polyvinylidene difluoride (PVDF), polyethylene, polypropylene, ethylene-propylene-diene terpolymer (EPDM), sulfonated EPDM, styrene-butadiene rubber (SBR), fluorocarbon rubber, carboxymethylcellulose, and/or other such thermoplastic resins, elastomeric polymers, polysaccharides and so forth may be employed singly or two or more thereof may be employed in combination. Furthermore, when employing a binder having functional group(s) that react with lithium such as polysaccharide, it is desirable to carry out methylation or the like, for example, so as to deactivate the functional group(s). It is preferred that this be present in an amount that is 1 wt % to 50 wt % of the positive electrode active material, and more preferred that this be present in an amount that is 2 wt % to 30 wt % thereof.

As filler for addition to positive electrode active material, materials not having adverse effect on battery performance may be employed. For example, polypropylene, polyethylene, and/or other such olefinic polymers, Aerosil (registered trademark of Evonik Degussa GmbH of Hanau-Wolfgang, Germany) fumed silica and/or other such pyrogenic oxide materials, zeolite, glass, carbon, and/or the like may be employed. It is preferred that filler be present in an amount that is 0 wt % to 30 wt % of the positive electrode active material.

The type and amount of solvent(s) which may be employed during preparation of positive electrode paste may be chosen based upon considerations of viscosity, volatility, paste thixotropy, and so forth. Furthermore, a mixture of two or more solvents may be added thereto. As examples of solvents, N-methyl-2-pyrrolidone (NMP) and other such organic solvents; binder-containing water and other such aqueous solutions; and so forth may be cited. It is preferred that solvent be present in an amount that is 40 wt % to 60 wt % of the positive electrode compound.

Note that there is no particular limitation with regard to the procedure for preparation of the positive electrode paste, so long as the method employed is such as to allow paste ingredients to be mixed uniformly. In preparing the positive electrode paste, besides the method described above in which solvent is added following preparation of the positive electrode compound, it is also possible to employ a method in which constituents of the positive electrode compound are simultaneously mixed with the solvent and added to the positive electrode active material, or a method in which binder is dissolved in solvent in advance and the other constituents are thereafter mixed therewith. Furthermore, because it will permit the electroconductor material to be dispersed more uniformly, it is preferred that the electroconductor material and the solvent be mixed uniformly in advance, and that this thereafter be mixed with the active material.

High-resistance layer constituent(s), i.e., inorganic and/or organic particles, binder(s), and where necessary, electroconductor material(s) and/or other such additive(s), are mixed together, and a suitable amount of solvent is moreover added thereto, to prepare high-resistance layer paste for application in the form of a coating.

As material for the high-resistance layer, mixtures of binder(s) with inorganic and/or organic particles may be employed. As particles, inorganic particles such as $Al_2O_3$, $SiO_2$, $ZrO_2$, $TiO_2$, and/or MgO; and/or organic particles such as polyimide powder, may, for example, be employed. Of these, from the standpoint of stability, ease of handling, and so forth, alumina is preferred; and from the standpoint of adhesion and bond strength with respect to the current collector foil, γ-alumina particles are particularly preferred.

As particles present within the high-resistance layer, while particles having a primary particle diameter median value of 1 nm to 2000 nm may be used, from the standpoint of adhesion and bond strength with respect to the current collector foil it is preferred that primary particle diameter median value be 1 nm to 200 nm, and more preferred that this be 1 nm to 10 nm. As used herein, primary particle diameter median value of particles present within the high-resistance layer refers to the median diameter obtained when 10 primary particles are observed under transmission electron microscopy.

As binder present within the high-resistance layer, polyvinylidene difluoride (PVDF), polytetrafluoroethylene (PTFE), polyimide, polyamide-imide, and so forth may, for example, be employed. Of these, from the standpoint of adhesion and bond strength with respect to current collector foil and/or active material layer, it is preferred that PVDF be employed. Furthermore, it is preferred that PVDF resin content be not less than 45 wt % and not more than 60 wt %.

A suitable amount of electroconductor material may also be added to the high-resistance layer. The primary function of the high-resistance layer in the present embodiment is to prevent abnormal generation of heat due to short circuit between the negative electrode and the current collector foil of the positive electrode. Although the high-resistance layer may have electrical-insulator-like characteristics, this does not preclude ability to prevent occurrence of short circuit; if the high-resistance layer is made noninsulating, in the event that a burr or the like produced during manufacture of the positive electrode or negative electrode penetrates the separator, it will be possible for gentle discharge of electricity to occur by way of the high-resistance layer, permitting prevention of abnormal generation of heat.

The type and amount of solvent(s) which may be employed during preparation of high-resistance layer paste may be chosen based upon considerations of viscosity, volatility, thixotropy, and so forth. Furthermore, a mixture of two or more solvents may be added thereto. As examples of solvents, N-methyl-2-pyrrolidone (NMP) and other such organic solvents; binder-containing water and other such aqueous solutions; and so forth may be cited. It is preferred that solvent be present in an amount that is 40 wt % to 60 wt % of the solids content within the high-resistance layer.

Note that there is no particular limitation with regard to the procedure for preparation of the high-resistance layer paste, so long as the method employed is such as to allow paste ingredients to be mixed uniformly. For example, solvent may be added following mixture of the foregoing powder, binder, and electroconductor material; powder, binder, electroconductor material, and solvent may be mixed simultaneously; or binder may be dissolved in solvent in advance, with powder and electroconductor material being thereafter mixed therewith.

Next described is application of paste and subsequent operations performed in the method for manufacturing a positive electrode in accordance with the present embodiment.

The positive electrode paste is applied to both faces of the strip-like positive electrode current collector foil. As the method for applying this thereto, the die coating method or the comma coating method may, for example, be employed. At this time, portions are left uncoated at either side edge portion of the current collector foil. Thickness of the positive electrode paste which is applied is such that thickness distribution in the width direction of the current collector foil is within ±5%, and preferably is within ±3%. Average thickness not including the current collector foil is typically 40 μm to 130 μm per face, or 80 μm to 260 μm for both faces.

To produce the tapered zone, e.g., when the die coating method is used, the shim (i.e., a component which is arranged so as to be inserted within the slit at the head of the die coater and which defines the dimensions of the slit) might be notched, machined, or otherwise modified so that it tapers in such fashion as to become thinner at the end(s) thereof, which will make it possible to reduce the amount of coating applied at the end region(s). Furthermore, by appropriately adjusting the location on the shim at which modification is carried out as well as the amount of machining or other modification therein performed thereat, it will be possible to control taper angle magnitude and tapered zone width.

Next, before the positive electrode paste has dried, i.e., before the positive electrode active material layer has dried, the high-resistance layer paste is applied so as to be adjacent to and in direct contact with either side edge portion of the positive electrode paste layer on each face. As the method for applying this thereto, known methods, e.g., the die coating method, may be employed.

One way of applying the high-resistance layer paste before the positive electrode paste layer has dried is to carry out application of positive electrode paste and application of high-resistance layer paste in continuous fashion. When the two operations are not carried out in continuous fashion, as when other operation(s) intervene therebetween, such as when, for example, the positive electrode current collector foil on which the positive electrode paste has been applied is to undergo inspection, temporary storage, transport, or other such operation(s), it is desirable that drying of the positive electrode paste layer not be allowed to proceed while such other operation(s) are being carried out. Based upon such considerations, between the time that the positive electrode paste is applied and the time that the high-resistance layer paste is applied, it is preferred that the positive electrode paste which has been applied be kept at a temperature that never exceeds 100° C., and it is more preferred that this be kept at a temperature that never exceeds 40° C. This will allow solvent to remain within the positive electrode paste. Especially where NMP or other such high-boiling-point solvent is used, this will make it possible for almost all of the solvent to remain within the paste. Accordingly, upon application of the high-resistance layer paste thereto, there will be intermingling at the interface with the positive electrode paste layer, making it possible to simply and definitively form a mixed phase.

Furthermore, it is preferred that the solvent used for the positive electrode paste and the solvent used for the high-resistance layer paste be mutually soluble.

As used herein, to say that two solvents are mutually soluble means that the two solvents will dissolve in each other, i.e., that they form a solution. As indicator of whether there is mutual solubility, equal amounts of two solvents may be placed in a closed vessel which is then agitated by shaking for 10 seconds, and if the two solvents are observed to have formed a single solution phase, they may be said to be mutually soluble.

Where the two solvents are the same solvent, they will of course be mutually soluble. Where the two solvents are different, they will be mutually soluble if they are both organic solvents and their solubility parameters (SP values) are close. Furthermore, by using the same substance, e.g., NMP, as primary constituent for both, it will be possible to prepare mutually soluble solvents. Or as another example, if water is used for both, it will be possible to prepare mutually soluble solvents.

Next, the positive electrode foil on which the positive electrode paste and the high-resistance layer paste have been applied is dried at 120° to 180° C. As the drying method, known method(s) may be employed.

The dried positive electrode is subjected to working by a press. In the present embodiment, because the positive electrode is strip-like, a roll press may be advantageously employed. As a result of working by the press, the positive electrode active material layer is typically compressed from a thickness of 40 µm to 130 µm per face before working by the press, to a thickness of 25 µm to 80 µm per face after working by the press.

After the strip-like positive electrode has been subjected to working by the press, the current collector foil will be exposed at either side edge portion thereof. After being stored temporarily as necessary, this positive electrode is then cut along the long direction centrally in the width direction thereof, and is in addition cut to the required length.

As a result of carrying out the foregoing operations, the electrode (positive electrode) of the present embodiment is manufactured.

Next described is an embodiment which is a battery employing the positive electrode of the foregoing embodiment.

The battery of the present embodiment is a lithium ion secondary battery comprising a wound electrode assembly in which the foregoing positive electrode and a negative electrode having a negative electrode active material layer on a current collector foil are laminated together in spiral fashion such that a separator intervenes therebetween.

The materials used in, and operations for manufacture of, the negative electrode will now be described.

As the negative electrode current collector, besides copper, nickel, iron, stainless steel, titanium, aluminum, baked carbon, electrically conductive polymer(s), electrically conductive glass(es), Al—Cd alloy(s), and/or the like, it is also possible to employ material(s) such as copper or the like, the surface of which has been treated with carbon, nickel, titanium, silver, or the like so as to improve adhesion, electrical conductivity, and oxidation resistance. Of these, iron foils, nickel foils, and copper foils, which are inexpensive, excel in electrical conductivity, and are stable at reduction sites, or foils comprising alloy(s) of any subset of these, may be favorably employed. When using copper foil, thickness is typically 7 µm to 15 µm, and material having a thickness of approximately 10 µm may be favorably employed.

As negative electrode active material, known material(s) that store and/or discharge Li ions may be employed. For example, lithium titanates having a spinel-type crystal structure; lithium metal; lithium-aluminum, lithium-lead, lithium-tin, lithium-aluminum-tin, lithium-gallium, and other such lithium-containing alloys; Wood's alloy; and also, natural graphite, artificial graphite, amorphous carbon, filamentous carbon, powdered carbon, petroleum-pitch-based carbon, coke-based carbon, and other such carbon materials may be cited. Moreover, carbon materials may be modified by addition of metal oxides such as tin oxide(s) and/or silicon oxide(s), or by addition of phosphorus and/or boron. Furthermore, graphite may be employed in combination with lithium metal, lithium-containing alloy, or the like; and the carbonaceous materials(s) employed in the present invention may have lithium intercalated therewithin in advance as a result of electrochemical reduction which is carried out in advance.

Operations for manufacture of the negative electrode are similar to operations for manufacture of the positive electrode.

Electroconductor material, binder, filler, and/or the like may be added as necessary to the negative electrode active material to prepare the negative electrode compound, and a suitable amount of solvent is added to the negative electrode compound to prepare the negative electrode paste for application in the form of a coating.

The type and amount of solvent(s) which may be employed during preparation of the negative electrode paste may be chosen based upon considerations of viscosity, volatility, thixotropy, and so forth. Furthermore, a mixture of two or more solvents may in some cases be added thereto. As an example of a solvent, N-methyl-2-pyrrolidone (NMP) and so forth may be cited. As was the case with the positive electrode paste, note that there is also no particular limitation with regard to the procedure for preparation of the negative electrode paste, so long as the method employed is such as will allow paste ingredients to be mixed uniformly.

The negative electrode paste is applied to both faces of the strip-like negative electrode current collector foil. As the method for applying this thereto, the die coating method may, for example, be employed. At this time, portions are left uncoated at either side edge of the current collector foil. Thickness of the negative electrode paste which is applied is such that thickness distribution in the width direction of the current collector foil is within ±5%, and preferably is within ±3%. Average thickness is typically 50 µm to 100 µm per face.

Next, the current collector foil on which the negative electrode paste has been applied is dried at 120° to 180° C. As the drying method, known method(s) may be employed.

The dried negative electrode is subjected to working by a press. In the present embodiment, because the negative electrode is strip-like, a roll press may be advantageously employed. As a result of working by the press, thickness of the negative electrode active material layer is typically compressed from 50 µm to 100 µm before working by the press, to 30 µm to 60 µm after working by the press.

After being subjected to working by the press, as was the case with the positive electrode, the negative electrode is then cut along the long direction centrally in the width direction thereof, and is cut to the required length.

Known material(s) may be employed in the separator of the battery. For example, polyolefinic, polyesteric, polyacrylonitrilic, polyphenylene-sulfidic, polyimidic, and/or fluororesinic microporous membrane(s) and/or nonwoven fabric(s) may be employed. Where separator wettability would otherwise be poor, treatment with surface active agent or the like may be carried out.

As electrolyte, known material(s) may be employed. For example, propylene carbonate, ethylene carbonate, butylene carbonate, chloroethylene carbonate, and other such cyclic carbonates; γ-butyrolactone, γ-valerolactone, propiolactone, and other such cyclic esters; dimethyl carbonate, diethyl carbonate, ethyl methyl carbonate, diphenyl carbonate, and other such chained carbonates; methyl acetate, methyl butyrate, and other such chained esters; tetrahydrofuran and derivatives thereof; 1,3-dioxane, dimethoxyethane, diethoxyethane, methoxyethoxyethane, methyl diglyme, and other such ethers; acetonitrile, benzonitrile, and other such nitriles; dioxalane and derivatives thereof and so forth; and the like may be employed singly or two or more thereof may be employed in combination.

The foregoing positive electrode and negative electrode are laminated and wound together such that the separator intervenes therebetween, this is housed within the external container, the foregoing nonaqueous electrolyte is added thereto and allowed to permeate therewithin, and initial charge cycling operations are carried out to complete fabrication of the secondary lithium ion battery of the present embodiment.

The present invention is not limited to the foregoing embodiments.

At the foregoing embodiments, an active material layer was applied to the surface of a current collector foil, a high-resistance layer was applied thereto before the active material layer had dried, and the entirety was thereafter dried to form a mixed phase at the interface therebetween. Alternatively or in addition thereto, the mixed phase may be achieved by, for example, providing, between the active material layer and the high-resistance layer, one or more thin layers having composition(s) intermediate therebetween.

Furthermore, whereas in the foregoing embodiments, following application of the active material layer to the surface of the current collector foil, the high-resistance layer was applied thereover in such fashion as to overlap the tapered zone of the active material layer, it is also possible to reverse the order of application of the two layers.

Figure 5:
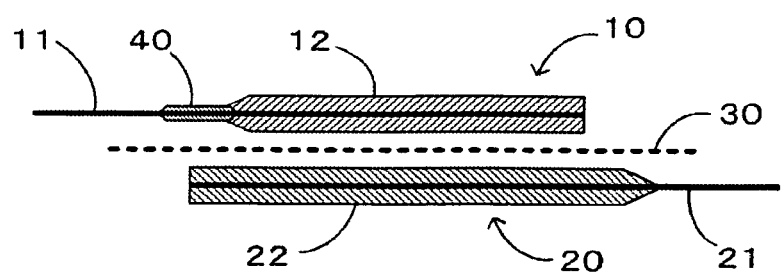
FIG. 5 is a drawing showing cross-sectional structure at a portion corresponding to a wound electrode assembly associated with another embodiment of the present invention.
Figure 6:
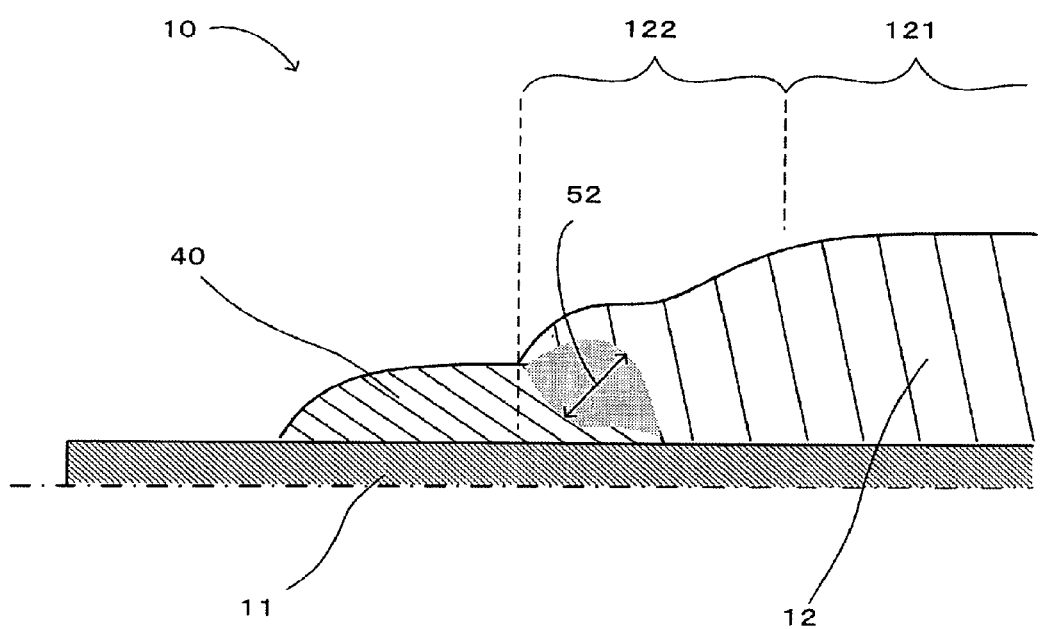
FIG. 6 is a sectional view of a positive electrode associated with another embodiment of the present invention.

FIG. 5 shows cross-sectional structure of an electrode assembly in which, following application of the high-resistance layer to the surface of the current collector, the active material layer was applied thereover in such fashion as to overlap the edge of the high-resistance layer. FIG. 6 shows an enlarged view of a location near the side edge of positive electrode current collector foil 11 in FIG. 5. Note that FIG. 6 shows the situation at only one face of current collector foil 11, and note further that the drawing is not to scale.

In this case, as shown at FIG. 6, because the edge of active material layer 12 is mounded up where it sits atop high-resistance layer 40, no wedge-shaped area is formed in the perpendicular section at the edge of active material layer 12. However, the concept of a bulk zone 121 at which thickness of active material layer 12 is more or less constant, and a tapered zone 122 at which thickness tapers off, can still be said to apply. Accordingly, the fact that it is more desirable that high-resistance layer 40 partially overlap tapered zone 122 of active material layer 12 but not overlap bulk zone 121 of the active material layer is similar to the situation at the foregoing embodiment shown in FIG. 1.

Furthermore, whereas in the foregoing embodiments a high-resistance layer was formed at the positive electrode, it is also possible to form a high-resistance layer at only the negative electrode, or to form high-resistance layers at both the positive electrode and the negative electrode. Where this is the case, materials (binder, filler, electroconductor material) and solvent employed for the high-resistance layer formed at the negative electrode may be the same as those employed when this was formed at the positive electrode. Moreover, the method for applying the high-resistance layer, the method for forming the mixed phase at the interface between the negative electrode active material layer and the high-resistance layer, the method for obtaining a desirable shape thereat, and so forth are similar to those employed for the positive electrode.

Furthermore, whereas in the foregoing embodiments the electrode of opposite polarity as the electrode on which the high-resistance layer was formed had structure such that an active material layer was formed on a current collector foil, the electrode of opposite polarity may be foil made of lithium metal, or of metal(s) capable of forming alloy(s) with lithium, or the like; or it may be a current collector comprising metal foam which is filled with active material.

Furthermore, whereas the foregoing embodiments were described in terms of an example of a lithium ion battery having an electrode assembly that was wound in spiral fashion, electrodes associated with the present invention may also be sheet-like members; accordingly, an electricity-storing device associated with the present invention may be such that the positive electrode, negative electrode, and separator are layered together to form a multilayer electrode assembly that is not wound in spiral fashion. Furthermore, the electricity-storing devices associated with the present invention is not limited to a lithium ion battery, but may be an alkali storage battery or other such battery employing aqueous electrolyte, or may be a lithium secondary battery or lithium primary battery having lithium metal foil as negative electrode. Moreover, electrodes associated with the present invention may also be employed in electrochemical capacitors which employ electrodes and which have structures similar to secondary batteries. Therefore, electricity-storing devices associated with the present invention include electrochemical capacitors.

Testing

Positive electrodes were fabricated under various conditions, and observations were made to determine whether delamination of the active material layer and the high-resistance layer had occurred following working by the press. Description of test methods and results follows.

Test 1

Manganese nitrate, nickel nitrate, and cobalt nitrate were mixed to achieve an atomic ratio such that Mn:Ni:Co was 9:9:2, and this was added to nitric acid and agitated while heating until completely dissolved. The nitric acid was then evaporated to obtain a salt mixture. Lithium hydroxide powder was added to this salt mixture, this was mixed using a ball mill, this was thereafter fired for 12 hours at 1000° C. in an oxygen atmosphere, and this was then ground and was thereafter classified to obtain a powder having a particle diameter median value (D50; hereinafter abbreviated "particle diameter") of 5 μm. Specific surface area as measured in accordance with the Brunauer, Emmett, and Teller (BET) method involving adsorption of an inert gas was 0.90 m$^2$/g.

Using this powder as positive electrode active material, the powder serving as positive electrode active material, acetylene black serving as electroconductor material, and polyvinylidene difluoride (PVDF) serving as binder were mixed in the weight ratio 85:10:5, N-methyl-2-pyrrolidone (NMP) serving as solvent was added thereto, and this was kneaded together to complete preparation of the positive electrode paste. Note that during mixture of PVDF, a solution in which solids content was dissolved and/or dispersed was employed, weight of the PVDF present within the solution being indicated at the foregoing wt % ratio.

For the high-resistance layer, 2.1 kg of γ-alumina particles having a primary particle diameter median value (hereinafter abbreviated "particle diameter") of 5 nm, a specific surface area of 96 m$^2$/g, and a tap density of 0.04 g/cm$^3$ were mixed in and dispersed uniformly throughout a solution diluted by addition of 6.0 kg of NMP to 21.39 kg of NMP solution containing 12% PVDF as binder (PVDF quantity=2.567 kg) to obtain a slurry-like high-resistance layer paste. Here, because the NMP is ultimately evaporated away, content of PVDF in the high-resistance layer becomes 2.567/(2.1+2.567)=55 wt %.

Under ambient conditions of 25° C., a die coater was used to apply the foregoing positive electrode paste to one face of an aluminum foil current collector of thickness 20 μm. At this time, a shim modified so as to be tapered was employed, adjustment being carried out to achieve a taper angle of 30°. Thickness at the bulk zone following drying was 70 μm, the amount of coating applied being 7.5 mg/cm² following drying.

Within 5 minutes following application of the positive electrode paste, before the positive electrode paste had dried, the die coating method was employed to apply the high-resistance layer paste, at a thickness of 10 μm over a region having a width of 4.5 mm, so as to overlap the edge of the positive electrode paste by 0.2 mm.

The positive electrode was thereafter dried for 2 minutes at 140° C., and this was subjected to working by a press to cause active material layer thickness following working by the press to be 50 μm.

Observation of the mixed phase and inspection to determine whether delamination had occurred were carried out by means of Al analysis using EPMA and optical microscopy.

Upon using optical microscopy to observe the situation in the vicinity of the interface between the active material layer and the high-resistance layer, it was found that delamination had not occurred at either the active material layer or the high-resistance layer.

As a result of observation of the cross-section using EPMA, although the positive electrode paste as prepared did not contain aluminum (Al), it was found that Al had migrated past (i.e., in the direction away from the high-resistance layer from) the active material particles. It was found that elemental aluminum had penetrated the gaps between active material particles to a distance of 30 μm, or the equivalent of 6 active material particle diameters, from the interface.

Figure 2:
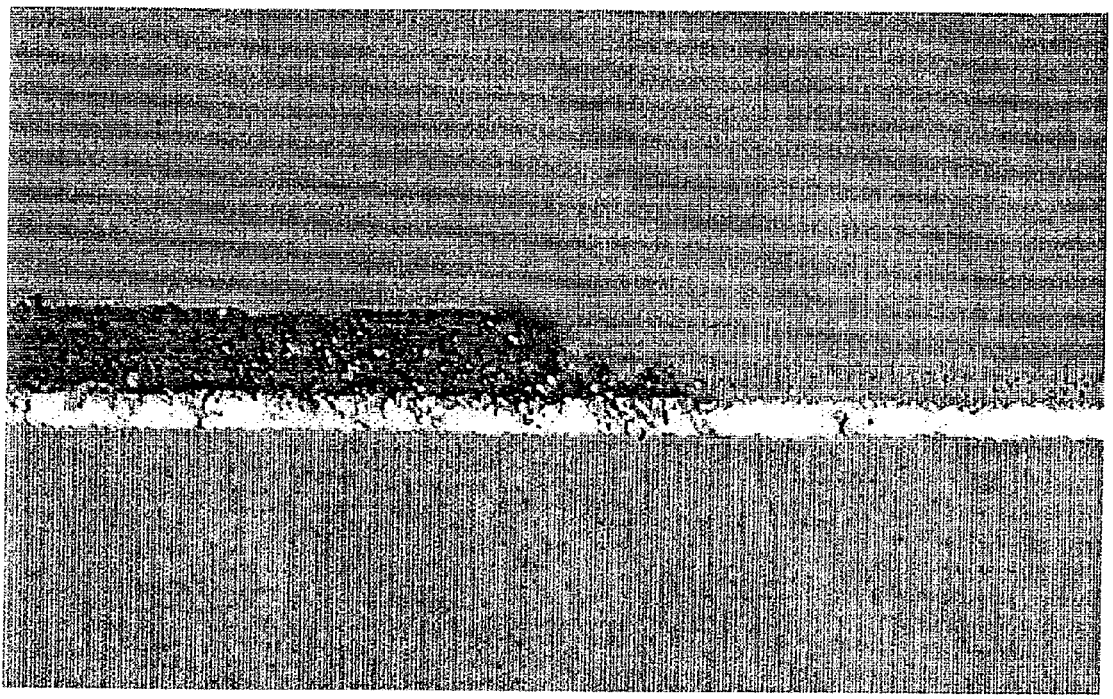
FIG. 2 is an optical micrograph showing a sectional view of a positive electrode in Test 1.

FIG. 2 shows a sectional optical micrograph.

The positive electrode active material layer which is applied over the positive electrode current collector foil has a bulk zone (at left in FIG. 2), where thickness of the positive electrode active material layer is more or less constant at approximately 50 μm; and a tapered zone, where thickness tapers off. A high-resistance layer (at right in FIG. 2) thickness approximately 10 μm in thickness has been applied so as to overlap the end portion of the active material layer, a mixed phase where the compositions of the two layers intermingle being formed at the interface between the positive electrode active material layer and the high-resistance layer. Thickness of the mixed phase extends to 30 μm at where greatest.

The mixed phase grows thin near the tip of the wedge-shaped area of the active material layer, this being thought to be due to the fact that flow of material is constrained in the vicinity of the current collector foil. This being the case, the location of the tip of the wedge-like area can easily be identified. By constructing an imaginary line intersecting the tip of the wedge-shaped area and passing through the interface between the active material layer and the high-resistance layer, it will be possible to measure the taper angle, which is the interior angle formed by this imaginary line and the surface of the current collector foil. Because the mixed phase is present at the interface between the active material layer and the high-resistance layer, there will be some degree of error involved when constructing an imaginary line passing through the interface. However, because the location of the tip of the wedge-like area can easily be identified, this error is at most on the order of ±5°. The taper angle at FIG. 2 was approximately 30°.

Furthermore, presence of the mixed phase may be more definitively determined by means of EPMA measurements. Although not readily apparent from FIG. 2, the high-resistance layer overlaps the active material layer over a region extending about ⅔ of the tapered zone thereof, growing thin near the tip. As a result of observations made using EPMA, it was found that the layer at which Al concentration was more or less equal to the average concentration within the high-resistance layer, i.e., the width of the portion of the high-resistance layer that overlaps the tapered zone was 2 μm to 4 μm.

Test 2

An electrode was fabricated using the same materials and methods as at Test 1, except that the high-resistance layer paste was applied following drying of the active material layer for 2 minutes at 140° C.

Based upon observations made using optical microscopy, it was found that severe delamination had occurred at the interface between the active material layer and the high-resistance layer.

Furthermore, as a result of inspection using EPMA, it was found that elemental aluminum had penetrated the gaps between active material particles of the active material layer to a distance of 2 μm, or the equivalent of approximately one-half of an active material particle diameter, perpendicularly from an imaginary boundary.

TABLE 1 shows principal manufacturing conditions and evaluation results for Test 1 and Test 2, as well as for the working examples and comparative examples described below.

In the table, what is indicated under the heading "Active Material Layer Dried?" is whether drying of the positive electrode paste was carried out between the time that the positive electrode paste was applied and the time that the high-resistance layer was applied. What is indicated under the heading "Mixed Phase Thickness" is the distance to which Al was found to have penetrated the active material layer to the greatest depth from the interface as determined based on an image showing elemental mapping by EPMA.

Comparing Test 1 and Test 2, the materials and methods employed at the two tests were identical, except that in the former the high-resistance paste was applied before the active material layer had dried, while in the latter the high-resistance paste was applied after the active material layer had dried. External dimensions of the various parts of the fabricated electrodes were identical, only the thicknesses of their respective mixed phases differing. Results of observations to determine whether delamination had occurred indicated that no delamination occurred at Test 1, but severe delamination occurred at Test 2. Based upon the foregoing results, it was concluded that formation at Test 1 of a mixed phase at the interface between the active material layer and the high-resistance layer permitted suppression of delamination at the two layers.

TABLE 1

| | Active Material Layer Thickness | | Active Material Layer Dried? | High-resistance layer Thickness | Ambient Temperature when High-resistance layer Applied | Mixed Phase Thickness | Taper Angle | Delamination and so forth when Worked by Press |
|---|---|---|---|---|---|---|---|---|
| | Before Working by Press | After Working by Press | | | | | | |
| Test 1 | 70 μm | 50 μm | No | 10 μm | 25° C. | 30 μm | 30° | No delamination |
| Test 2 | 70 μm | 50 μm | Yes | 10 μm | 25° C. | 2 μm | 30° | Severe delamination |
| Test 1 | 70 μm | 50 μm | No | 10 μm | 25° C. | 30 μm | 30° | No delamination |
| Test 3 | 70 μm | 50 μm | No | 40 μm | 25° C. | 30 μm | 30° | No delamination |
| Test 4 | 70 μm | 50 μm | No | 60 μm | 25° C. | 30 μm | 30° | Delamination; cracking of high-resistance layer |
| Test 5 | 70 μm | 50 μm | No | 10 μm | 25° C. | 30 μm | 20° | No delamination |
| Test 1 | 70 μm | 50 μm | No | 10 μm | 25° C. | 30 μm | 30° | No delamination |
| Test 6 | 70 μm | 50 μm | No | 10 μm | 25° C. | 20 μm | 45° | No delamination |
| Test 7 | 70 μm | 50 μm | No | 10 μm | 25° C. | 20 μm | 60° | Partial delamination |
| Test 8 | 70 μm | 50 μm | No | 10 μm | 25° C. | 7 μm | 80° | Partial delamination |
| Test 9 | 70 μm | 50 μm | No | 10 μm | 25° C. | 0 μm | 90° | Delamination |
| Test 1 | 70 μm | 50 μm | No | 10 μm | 25° C. | 30 μm | 30° | No delamination |
| Test 10 | 70 μm | 50 μm | No | 10 μm | 40° C. | 20 μm | 30° | No delamination |
| Test 11 | 70 μm | 50 μm | No | 10 μm | 60° C. | 10 μm | 30° | Delamination |

Test 3

An electrode was fabricated using the same materials and methods as at Test 1, except that thickness of the high-resistance layer was 40 μm.

Based upon observations made using optical microscopy, it was found that delamination had not occurred at either the active material layer or the high-resistance layer.

As a result of inspection using EPMA, it was found that elemental aluminum had penetrated the gaps between active material particles of the active material layer to a distance of 30 μm, or the equivalent of 6 active material particle diameters, perpendicularly from an imaginary boundary.

Test 4

An electrode was fabricated using the same materials and methods as at Test 1, except that thickness of the high-resistance layer was 60 μm.

Based upon observations made using optical microscopy, it was found that delamination had occurred at the interface between the active material layer and the high-resistance layer, and that cracking had occurred at the high-resistance layer.

As a result of inspection using EPMA, it was found that elemental aluminum had penetrated the gaps between active material particles of the active material layer to a distance of 30 μm, or the equivalent of 6 active material particle diameters, perpendicularly from an imaginary boundary.

Comparing the results of Test 1, Test 3, and Test 4, it can be seen that delamination did not occur at Test 1 and Test 3, but at Test 4—though not as severe as at Test 2—delamination was seen at the interface between the active material layer and the high-resistance layer, and cracking was observed at the high-resistance layer. At Test 4, thickness of the high-resistance layer was 60 μm, which was thicker than the active material layer. Based upon this fact, it is clear that the entirety of the high-resistance layer would have undergone working by the press during operations involving working by the press, which is believed to have caused production of a large amount of strain at the interface with the active material layer. It is believed that the reason delamination was not as severe as at Test 2 was due to the effect of the mixed phase.

Test 5

An electrode was fabricated using the same materials and methods as at Test 1, except that the shim employed at the die coater was modified so as to be tapered and was modified so as to be notched, for a taper angle of 20°.

Based upon observations made using optical microscopy, it was found that delamination had not occurred at either the active material layer or the high-resistance layer.

As a result of inspection using EPMA, it was found that elemental aluminum had penetrated the gaps between active material particles of the active material layer to a distance of 30 μm, or the equivalent of 6 active material particle diameters, perpendicularly from an imaginary boundary.

Test 6

An electrode was fabricated using the same materials and methods as at Test 1, except that the shim employed at the die coater was modified so as to be notched, for a taper angle of 45°.

Based upon observations made using optical microscopy, it was found that delamination had not occurred at either the active material layer or the high-resistance layer.

As a result of inspection using EPMA, it was found that elemental aluminum had penetrated the gaps between active material particles of the active material layer to a distance of 20 μm, or the equivalent of 4 active material particle diameters, perpendicularly from an imaginary boundary. Furthermore, at the surface of the active material layer bulk zone, a layer having high concentration of elemental aluminum was observed extending over a distance of approximately 100 μm. This indicated that high-resistance layer paste had been applied at not only the tapered zone, but also over the bulk zone, of the active material layer.

Test 7

An electrode was fabricated using the same materials and methods as at Test 1, except that the shim employed at the die coater was modified so as to be notched, for a taper angle of 60°.

Based upon observations made using optical microscopy, it was found that delamination had occurred at only a small portion of the interface between the active material layer and the high-resistance layer.

As a result of inspection using EPMA, it was found that elemental aluminum had penetrated the gaps between active material particles of the active material layer to a distance of 20 μm, or the equivalent of 4 active material particle diameters, perpendicularly from an imaginary boundary. At the surface of the active material layer bulk zone, a layer having high concentration of elemental aluminum was observed extending over a distance of approximately 150 μm.

Test 8

An electrode was fabricated using the same materials and methods as at Test 1, except that the shim employed at the die coater was modified so as to be notched, for a taper angle of 80°.

Based upon observations made using optical microscopy, it was found that delamination had occurred at only a small portion of the interface between the active material layer and the high-resistance layer.

As a result of inspection using EPMA, it was found that elemental aluminum had penetrated the gaps between active material particles of the active material layer to a distance of 7 μm, or the equivalent of slightly more than 1 active material particle diameter, perpendicularly from an imaginary boundary. At the surface of the active material layer bulk zone, a layer having high concentration of elemental aluminum was observed extending over a distance of approximately 300 μm.

Test 9

An electrode was fabricated using the same materials and methods as at Test 1, except that the shim employed at the die coater was unmodified by notching or the like, for a taper angle of 90°, and the high-resistance layer paste was applied so as not to overlap the positive electrode paste layer that had been applied therebefore.

Based upon observations made using optical microscopy, it was observed that the active material layer and the high-resistance layer had delaminated from the current collector foil.

As a result of inspection using EPMA, it was found that elemental aluminum had not penetrated the active material layer, and a mixed phase had not formed at the interface between the active material layer and the high-resistance layer.

Comparing the results of Test 1 and Tests 5 through 9, it can be seen that the smaller the taper angle the less tendency there was for the active material layer and the high-resistance layer to delaminate. Furthermore, while partial delamination was seen to occur at Test 7 (60° taper angle) and at Test 8 (80° taper angle), no delamination whatsoever was observed when taper angle was smaller than at Test 6 (45° taper angle).

At Test 9, note that taper angle was 90°, and note further that the high-resistance layer paste was applied in such fashion as to cause the high-resistance layer not to overlap the active material layer. Accordingly, the two layers would have been in contact only at the edge of the high-resistance layer of thickness 10 μm. When surface area of the interface between the two layers is small, as was the case here, it might have been thought that despite working of the active material layer by the press the amount of deformation and stress in the vicinity of the interface would be less than would have been the case had the two layers been in a mutually overlapping relationship. So the fact that delamination was found to occur, even allowing for the fact that there was no mixed phase at the interface between the two layers, was a surprising result.

Close observation of the location at which delamination took place at Test 9 revealed that the active material layer, in the vicinity of the interface, had delaminated. While the cause of this is unclear, one possibility is that this is due to difference in binder concentrations present in the two layers. That is, it is possible that solvent migrated from the high-resistance layer, which had high binder concentration, to the active material layer, which had low binder concentration, and that reduced solvent concentration within active material layer 12 was responsible for the increased tendency of the active material layer to delaminate.

Test 10

An electrode was fabricated using the same materials and methods as at Test 1, except that, following application of the positive electrode paste, the high-resistance layer paste was applied at an ambient temperature of 40° C.

Based upon observations made using optical microscopy, it was found that delamination had not occurred at either the active material layer or the high-resistance layer.

As a result of inspection using EPMA, it was found that elemental aluminum had penetrated the gaps between active material particles of the active material layer to a distance of 20 μm, or the equivalent of 4 active material particle diameters, perpendicularly from an imaginary boundary.

Test 11

An electrode was fabricated using the same materials and methods as at Test 1, except that, following application of the positive electrode paste, the high-resistance layer paste was applied at an ambient temperature of 60° C.

Based upon observations made using optical microscopy, it was found that delamination had occurred at the interface between the active material layer and the high-resistance layer.

As a result of inspection using EPMA, it was found that elemental aluminum had penetrated the gaps between active material particles of the active material layer to a distance of 10 μm, or the equivalent of 2 active material particle diameters, perpendicularly from an imaginary boundary.

Comparing the results of Test 1, Test 10, and Test 11, it is clear that the higher the ambient temperature at the time that the high-resistance layer paste is applied the less penetration there will be into the active material layer by elemental aluminum, i.e., the smaller will be the thickness of the mixed phase at the interface. In addition, whereas it was found that delamination had not occurred at Test 1 and Test 10, it was found at Test 11 that delamination had occurred at the interface between the active material layer and the high-resistance layer. Based upon this fact, it is clear that it is preferred that, between the time that the positive electrode paste is applied and the time that the high-resistance layer paste is applied, the positive electrode paste which has been applied be kept at a temperature that never exceeds 40° C. That is, it is clear that it is preferred that, between the operation in which the active material layer is applied and the operation in which the high-resistance layer is applied, there be only operation(s) which can be carried out without causing the temperature of the active material layer to exceed 40° C.

Furthermore, while delamination did occur at Test 11, upon comparing this with Test 2, where external dimensions of the various parts of the fabricated electrodes were identical, it is seen that the degree of delamination that occurred at Test 11 was not as severe as that which occurred at Test 2. Based upon this fact, while Test 11 might not have been the best mode of the present invention, it is thought that the results of Test 11 did indicate a delamination suppression effect due to the mixed phase.

EXPLANATION OF REFERENCE NUMERALS

1 Wound electrode assembly
10 Positive electrode
11 Positive electrode current collector foil
12 Positive electrode active material layer
20 Negative electrode
21 Negative electrode current collector foil
22 Negative electrode active material layer
25 Negative electrode edge
30 Separator
40 High-resistance layer
50 Interface between active material layer and high-resistance layer
51 Mixed phase
121 Maximum thickness of mixed phase
121 Bulk zone of positive electrode active material layer
122 Tapered zone of positive electrode active material layer
123 Taper angle

What is claimed is:

1. An electricity-storing device, comprising:
a first electrode comprising:
a current collector foil;
an active material layer formed on at least one surface of the current collector foil; and
an electrical resistance layer formed on the at least one surface of the current collector foil so as to be adjacent to and in direct contact with the active material layer, at least a portion of an interface between the active material layer and the electrical resistance layer comprising a mixed phase where constituents from the active material layer and the electrical resistance layer intermingle;
a second electrode of opposite polarity as the first electrode; and
a separator,
wherein a concentration of an element in the mixed phase decreases in a direction that is perpendicular to the interface and toward the current collector foil, and
wherein the electrical resistance layer comprises inorganic particles in a binder, the inorganic particles having a primary particle diameter median value in a range from 1 nm to 2000 nm.

2. The electricity-storing device of claim 1, wherein the primary particle diameter median value of the inorganic particles is 1 nm or more and 200 nm or less.

3. The electricity-storing device of claim 1, wherein the primary particle diameter median value of the inorganic particles is 1 nm or more and 10 nm or less.

4. The electricity-storing device of claim 1, wherein the concentration of the element in the mixed phase is intermediate between a concentration of the element in the electrical resistance layer and a concentration of the element in the active material layer.

5. The electricity-storing device of claim 1, wherein the first electrode, the second electrode and the separator are laminated together to form a laminated electrode assembly.

6. The electricity-storing device of claim 1, wherein the mixed phase comprises a thickness which is not less than a particle diameter median value of active material particles present within the active material layer.

7. The electricity-storing device of claim 1, wherein a thickness of the active material layer is greater than a thickness of the electrical resistance layer.

8. The electricity-storing device of claim 1, wherein the active material layer is subjected to working by a press, and a portion of the electrical resistance layer that does not overlap the active material layer is not subjected to working by the press.

9. The electricity-storing device of claim 1, wherein the active material layer comprises:
a bulk zone at which thickness is substantially constant, and
a tapered zone at which thickness tapers off; and
wherein the electrical resistance layer overlaps a portion of the tapered zone of the active material layer, but does not overlap the bulk zone of the active material layer.

10. The electricity-storing device of claim 9, wherein a taper angle of the tapered zone is not greater than 80°, the taper angle comprising a wedge-shaped interior angle in a perpendicular section of an edge of the active material layer.

11. The electricity-storing device of claim 10, wherein the taper angle is not greater than 45°.

12. A method of forming an electricity-storing device, the method comprising:
forming a first electrode, comprising:
forming a current collector foil;
forming an active material layer on a surface of the current collector foil; and
forming an electrical resistance layer on the surface of the current collector foil so as to be adjacent to and in direct contact with the active material layer, at least a portion of an interface between the active material layer and the electrical resistance layer comprising a mixed phase where constituents from the active material layer and the electrical resistance layer intermingle;
forming a second electrode of opposite polarity as the first electrode; and
forming a separator,
wherein a concentration of an element in the mixed phase decreases in a direction that is perpendicular to the interface and toward the current collector foil, and
wherein the electrical resistance layer comprises inorganic particles in a binder, the inorganic particles having a primary particle diameter median value in a range from 1 nm to 2000 nm.

13. The method of claim 12, wherein the concentration of the element in the mixed phase is intermediate between a concentration of the element in the electrical resistance layer and a concentration of the element in the active material layer.

14. The method of claim 12, wherein the mixed phase comprises a thickness which is not less than a particle diameter median value of active material particles present within the active material layer.

15. The method of claim 12, wherein a thickness of the active material layer is greater than a thickness of the electrical resistance layer.

16. The method of claim 12, wherein a solvent employed during the forming of the active material layer and a solvent employed during the forming of the electrical resistance layer are mutually soluble.

17. The method of claim 12, wherein one of the active material and electrical resistance layers comprises a first applied layer and the other of the active material and electrical resistance layers comprises a second applied layer which is formed after the first applied layer, and
wherein the forming of the second applied layer comprises forming the second applied layer to be adjacent to and in direct contact with the first applied layer before the first applied layer has dried.

18. The method of claim 17, wherein between the forming of the first applied layer and forming of the second applied layer, only operations which can be carried out without causing a temperature of the first applied layer to exceed 40° C. are performed.

* * * * *